United States Patent [19]

Kim et al.

[11] Patent Number: 5,187,954
[45] Date of Patent: Feb. 23, 1993

[54] COOLING DEVICE FOR WASHING MACHINE TRANSMISSION

[75] Inventors: Hyung S. Kim; Kyoung H. Kim, both of Seoul, Rep. of Korea

[73] Assignee: Samsung Electronics Co., Ltd., Suweon, Rep. of Korea

[21] Appl. No.: 790,173

[22] Filed: Nov. 12, 1991

[30] Foreign Application Priority Data

Nov. 15, 1990 [KR] Rep. of Korea ............ 90-18485

[51] Int. Cl.⁵ .............................................. D06F 37/00
[52] U.S. Cl. ...................................... 68/3 R; 68/23.7; 68/133; 192/113 A
[58] Field of Search ............ 134/105, 102, 57 D; 68/3 R, 23.7, 133; 310/52, 62, 63; 417/353, 354; 192/113 A

[56] References Cited

U.S. PATENT DOCUMENTS

| | | | |
|---|---|---|---|
| 2,300,231 | 10/1942 | Landgraf | 68/3 R |
| 2,422,022 | 6/1947 | Koertge | 134/105 X |
| 2,656,702 | 10/1953 | Chapin | 68/23.7 X |
| 2,734,122 | 2/1956 | Flannery | 134/105 X |
| 3,072,129 | 1/1963 | Seal | 134/57 D |
| 3,103,227 | 9/1963 | Long | 134/105 X |
| 3,807,420 | 4/1974 | Donselman et al. | 134/102 |

Primary Examiner—Frankie L. Stinson
Attorney, Agent, or Firm—Burns, Doane, Swecker & Mathis

[57] ABSTRACT

A washing machine includes a tub in which a basket and agitator are mounted. A transmission produces rotation of the basket and oscillation of the agitator. A shaft transmits rotary motion to the transmission from a motor via a pulley mounted on the shaft. The transmission includes a housing having heat conducting openings. Blades are mounted on the pulley for forcing air through the openings during rotation of the shaft.

12 Claims, 2 Drawing Sheets

COOLING DEVICE FOR WASHING MACHINE TRANSMISSION

FIELD OF THE INVENTION

The present invention is related to a cooling device for a transmission in a washing machine.

A conventional washing machine comprises an external cabinet, a tub mounted within the external cabinet for containing washing and rinse water, a basket rotatively mounted in the tub, and an agitator mounted within the basket with oscillatory rotation in both directions i.e. clockwise and counter-clockwise. Rotational force of a motor positioned below the tub is transmitted to the transmission via a pulley and a belt arrangement. The agitator or tub is rotated by transmission shafts under the selective control of the transmission. The conventional transmission includes a planetary gear train and a housing enclosing the planetary gear train. With the rotational reduction of the planetary gear train, the rotational force of the pulley is transmitted to the agitator at a reduced rotational speed. Heat generated during the rotation of the transmission radiates through the housing. A typical conventional transmission is shown in Japanese Utility Model Laid-Open No. 1989-66289. The external surface area of the housing of this transmission is not sufficient in that the surface area cannot satisfactorily radiate the heat produced by the frictional engagement of the planetary gear train during a reduction of rotational output. Further, the transmission can not achieve adequate radiation from natural convection alone. Because of these effects, the life of the planetary gear train, made of an organic resin, is shortened. Furthermore, the operational efficiency of the washing machine is decreased due to the thermal expansion of the planetary gear train.

SUMMARY OF THE INVENTION

An object of the present invention is to provide a cooling device which can sufficiently radiate heat generated by gearing of a washing machine transmission by the increasing the surface area of the transmission available for heat radiation generated during use.

Another object of the present invention is to provide a cooling device which forceably convects the heat radiated by the transmission thereby extending the life of the transmission, and increasing the operating efficiency of the washing machine.

In accordance with the present invention, the cooling device for transmission comprises passive cooling members and an active cooling member. The passive cooling members provide a housing for the transmission which transmits rotational force of the motor to the basket and the agitator respectively, and reduces heat generated by operation of the reduction member mounted therein. Further, the passive cooling members consist of an upper and a lower cup, with each of the cups having a plurality of openings formed therein for enable air communication therethrough. The reduction member consists of a case drum and a gear case in which a planetary gear train is included. The case drum includes a plurality of opening formed therein to enable air communication therethrough. The active cooling member is mounted on a pulley which transmits rotational force from the motor to the transmission, and communicates with the passive cooling members by forcing cooling air to the passive cooling member.

DETAILED DESCRIPTION

Figure 1:
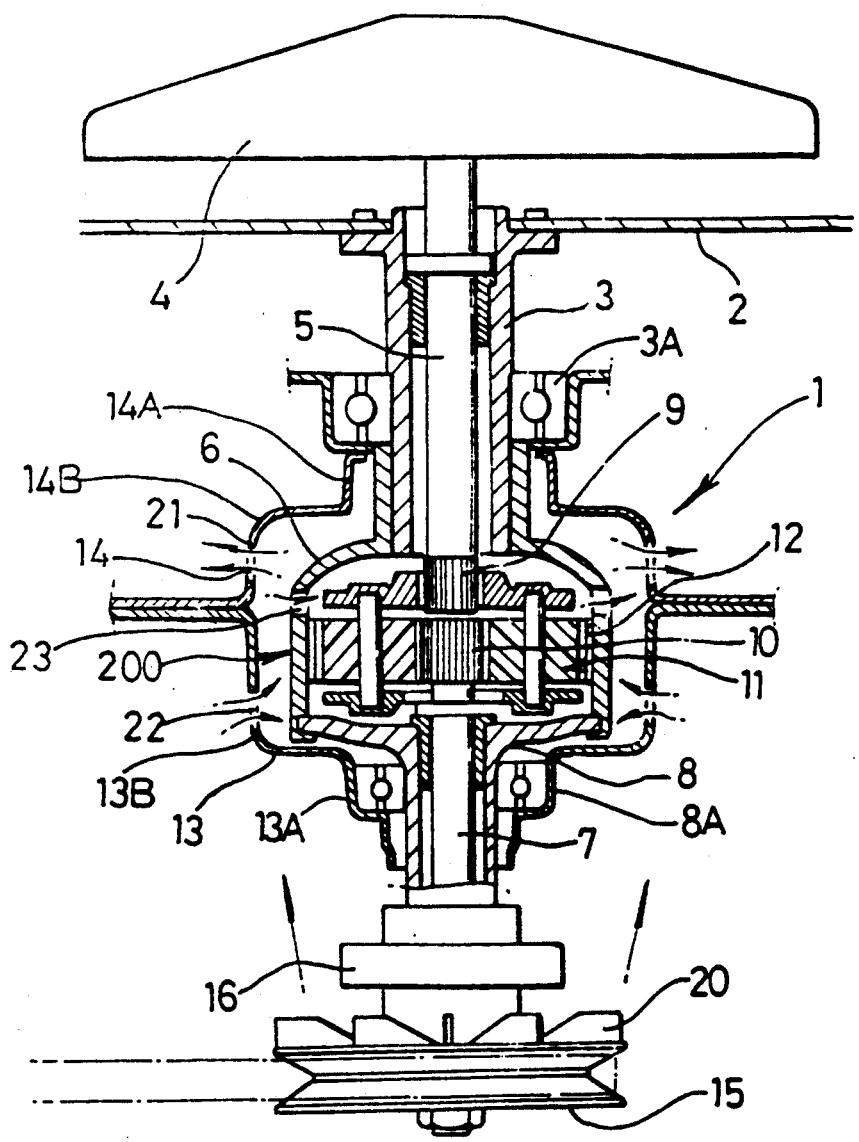
FIG. 1 is a cross sectional view of the transmission with a cooling device according to the present invention.

Referring to FIG. 1, a basket 2 for washing and rinsing (partially shown) contains an agitator 4 for agitating in both a clockwise and counter-clockwise directions is installed in the basket 2. Pulley 15 transmits rotational force of the motor (not shown) to the transmission 1. The pulley 15 is connected with the transmission 1 through a first driving shaft 7 and a second driving shaft 8. The transmission 1 is connected with the agitator 4 by a first driven shaft 5 and is connected with the basket 2 by a second driven shaft 3.

Figure 2:
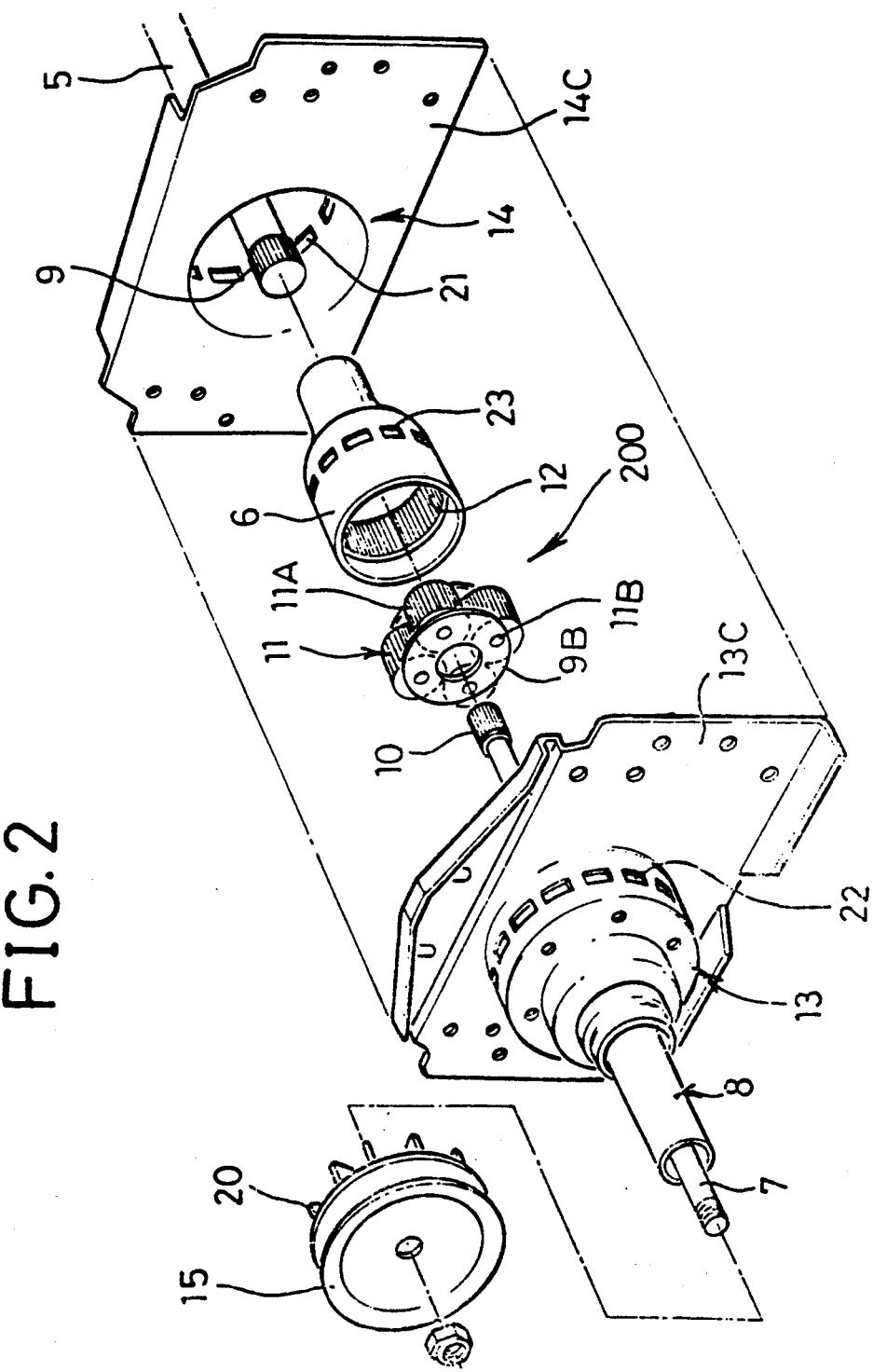
FIG. 2 is an exposed view illustrating the cooling device according to the present invention.

The transmission 1 comprises passive cooling members 13,14 which function as a housing for the transmission 1 and also radiate the heat generated therein, and a reduction member 200 transmits the rotational force of the pulley 15 to the agitator 4 and the basket 2, respectively. As shown in FIG. 2, the reduction member 200 comprises a case drum 6 with a ring gear 12, usually made of an organic resin, operatively positioned on an internal surface thereof and the second driving shaft 8. An upper circular portion of the second driving shaft 8 connects securely with a lower portion of the case drum 6, and a lower protrusive portion of the second driving shaft 8 connects rotatably in a bushing with the first driving shaft 7. A plurality of openings 23 are formed in a circular portion of the case drum 6 which adjoins the upper circular line of the ring gear 12. Inside the case drum 6 planetary gears 11, which mesh with the ring gear 12, are positioned. The planetary gear system consists of four pinions 11A, top plate 9A and bottom plate 9B, and four pins 11B engaging the pinions 11A with the top and the bottom plates 9A, 9b. The pinions 11A are usually made of a organic resin material. To work the planetary gears 11, a sun gear 10 is provided at the top end of the first driving shaft 7 and the external teeth of the sun gear 10 are molded of a resin. A driven gear 9 is provided at the bottom end of the first driven shaft 5 so that the driven gear 9 is driven by the planetary motion of the planetary gears 11 and the external teeth of the driven gear are molded of a resin. The first driven shaft 5 is assembled rotatively in a bushing with the second driven shaft 3. A top end of the second driven shaft 3 is bolted to the basket 2. The middle portion of the second driven shaft 3 is support by a bearing 3A, and the bottom portion thereof is assembled tightly in an upper protrusive portion of the case drum 6. The passive cooling member 13, 14 consists of a lower cup 13 which is formed as a downward extended cylinder having a step shown in FIG. 2, and an upper cup 14 which is formed as an upward extended cylinder and assembled with the lower cup 13. A lower hub 14B of the upper cup 14 has a plurality of openings 21 formed along a circular portion of the lower hub 14B. A middle hub 13A of the lower cup 13 is formed so that the column portion of the gear case 8 is supported by a bearing 8A placed in the middle hub 13A. A lower hub 13B of the lower cup 13 has a plurality of openings 22 formed along a circular portion of the lower hub 13B. A flange 13C of the lower cup 13 and a flange 14C of the upper cup 14 are formed integrally with the lower hub 13B, 14B, respectively. The flanges 13C, 14C are formed as an approximated square and assembled with a cross-member (not shown). It is desirable to have a large surface for enhancing maximum radiation from the upper cup 14 and the lower cup 13. The active cooling device 20, e.g. a plurality of blades for forcing the movement of air, is formed on an upper surface of the pulley 15. The active cooling device 20 rotates as pulley 15 is rotated, so the air neighboring the active cooling device 20 is forced toward the transmission 1.

As a result of the above structure, the pulley 15 is oscillated by the motor, and the rotational force of the pulley 15 is transmitted to the first driving shaft 7 via a selective connection of a coupling 16. The sun gear 10 of the first driving shaft 7 rotates the planetary gears 11, and the planetary gears 11 rotate the first driven shaft 5 via the driven gear 9. At this time, heat is generated from the operation of the planetary gear train 10, 11, 12. The heat flows to the cooler exterior surface of the passive cooling members 13, 14 through the reduction member 200. This transferred heat then radiates from the surface of the passive cooling members 13, 14. Furthermore, the heat from the surface of the passive cooling member 13, 14 is forcibly moved by the air generated by the active cooling device 20 on the pulley 15. The air is fed into the cooling device 1 through the plurality of openings 22. The air is forced into and out of the reduction device 200 through the plurality of openings 23 of the case drum 6. The heated air of the reduction member 200 is forced out through the plurality of openings 21 of the upper cup 13.

Therefore, the heat of the reduction member 200 is removed in a more efficient manner, and thus prevents the planet gear train from wear causing excessive heat.

What is claimed is:

1. Washing machine having a tub, a basket enclosed by said tub, an agitator mounted in said basket, a transmission for producing rotation of said basket and rotary oscillation of said agitator, a motor, a first shaft for transmitting a driving force of said motor to said transmission, a second shaft for transmitting said driving force from said transmission to said agitator, said transmission including gears and an outer housing surrounding said gears, and a cooling mechanism comprising:

passive cooling means for enabling heat generated during operation to move away from said transmission and including said outer housing of said transmission in which a plurality of openings are formed; and active cooling means for forcing air through said plurality of openings to remove heat generated by said transmission and including a plurality of blades mounted for rotation with said first shaft such that upon rotation of said shaft, said blades force air toward and into at least one of said openings and out at least one other of said openings to remove heat generated during operation.

2. The washing machine according to claim 1 including a pulley mounted on said second shaft for transmitting rotation from said motor to said second shaft, said blades being mounted on said pulley.

3. The washing machine according to claim 2, wherein said pulley is mounted below said housing, and said blades are mounted on an upper surface of said pulley.

4. The washing machine according to claim 1, wherein said housing comprises upper and lower cups enclosing said transmission, with each of said cups having a plurality of said openings formed therein.

5. The washing machine according to claim 4, wherein said housing comprises a case drum disposed within a space formed by said upper and lower cups and includes a plurality of said openings formed therein.

6. The washing machine according to claim 5, wherein said transmission includes a plurality of gears disposed within said case drum.

7. The washing machine according to claim 4, wherein said upper and lower cups include external flanges connected to one another, said openings comprising upper and lower openings disposed above and below said flanges, respectively.

8. The washing machine according to claim 1, wherein said housing comprises a case drum and a gear case, said case drum including a plurality of said openings formed therein.

9. The washing machine according to claim 1, wherein said transmission includes a plurality of gears disposed within said case drum.

10. The washing machine according to claim 9, wherein said openings in said housing include vertically spaced openings.

11. A washing machine having a tub, a basket enclosed by said tub, an agitator mounted in said basket, a transmission for producing rotation of said basket and rotary oscillation of said agitator, said transmission including gears surrounded by an outer housing, a motor, a shaft for transmitting a driving force of said motor to said transmission, and a cooling mechanism comprising:

passive cooling means including said outer housing of said transmission with a plurality of openings being formed therein, in which said housing is provided with upper and lower cups enclosing said transmission, each of said cups having some of said openings formed therein, and a case drum disposed within a space formed by said upper and lower cups, said case drum surrounding said gears and having some of said openings formed therein; and active cooling means including a pulley mounted below said outer housing and a plurality of blades mounted on an upper surface of said pulley for directing air upwardly toward said transmission.

12. A washing machine according to claim 11, wherein said upper and lower cups include external flanges connected to one another, said openings comprising upper and lower openings disposed above and below said flanges, respectively.

* * * * *